United States Patent [19]

Cornett et al.

[11] Patent Number: 5,053,758

[45] Date of Patent: Oct. 1, 1991

[54] TOUCHSCREEN CONTROL PANEL WITH SLIDING TOUCH CONTROL

[75] Inventors: Johnny A. Cornett, Crozet; James D. Corbett, Charlottesville, both of Va.

[73] Assignee: Sperry Marine Inc., Charlottesville, Va.

[21] Appl. No.: 476,118

[22] Filed: Feb. 1, 1990

Related U.S. Application Data

[63] Continuation of Ser. No. 151,041, Feb. 1, 1988, abandoned.

[51] Int. Cl.$^5$ .............................................. G09G 5/00
[52] U.S. Cl. ........................................ 340/712; 341/33
[58] Field of Search .............. 340/706, 709, 710, 711, 340/712; 178/18, 19; 341/20, 22, 24, 33

[56] References Cited

U.S. PATENT DOCUMENTS

| | | | |
|---|---|---|---|
| 4,121,204 | 10/1978 | Welch et al. | 340/712 |
| 4,221,975 | 9/1980 | Ledniczki et al. | 341/20 |
| 4,413,314 | 11/1983 | Slater et al. | 340/712 |
| 4,464,652 | 8/1984 | Lapson et al. | 340/710 |
| 4,631,525 | 12/1986 | Serravalle, Jr. | 340/712 |
| 4,639,881 | 1/1987 | Zingher | 340/712 |
| 4,706,090 | 11/1987 | Hashiguchi et al. | 340/712 |
| 4,757,549 | 7/1988 | Machart et al. | 178/18 |
| 4,812,833 | 3/1989 | Shimauchi | 178/18 |
| 4,821,030 | 4/1989 | Batson et al. | 340/712 |
| 4,903,012 | 2/1990 | Ohuchi | 340/709 |

OTHER PUBLICATIONS

Hoffman, Jr., "Exact Position Detection with Finger Point and Feedback", IBM Technical Disclosure Bulletin, vol. 23, No. 6, Nov. 1980.

Minsky, "Manipulating Simulated Objects with Real-World Gestures Using a Force and Position Sensitive Screen", Computer Graphics, vol. 18, No. 3, Jul. 1984.

*Primary Examiner*—Alvin E. Oberley
*Assistant Examiner*—Richard Hjerpe
*Attorney, Agent, or Firm*—Seymour Levine; Albert B. Cooper

[57] ABSTRACT

Touchscreen control panel apparatus that highlights a control key to which the operator slides touch and actuates the associated control function upon touch release from the highlighted key. Highlighting is deleted from a key when operator slides touch therefrom without releasing touch. Parameter values are adjusted by touching a control key associated therewith and thereafter sliding touch anywhere on the touchscreen to effect parameter value change.

12 Claims, 3 Drawing Sheets

TOUCHSCREEN CONTROL PANEL WITH SLIDING TOUCH CONTROL

This is a continuation of co-pending application Ser. No. 07/151,041 filed on Feb. 1, 1988, now abandoned.

BACKGROUND OF THE INVENTION

1. Field of the Invention

The invention relates to graphically generated control panels utilizing a touchscreen overlay on the display monitor.

2. Description of the Prior Art

Touchscreen control panels are known in the art that utilize a touchscreen overlay on the raster cathode ray tube (CRT) monitor. The system software displays graphic symbology on the monitor representing the front panel controls for the system. The operator interfaces with the system by touching the screen in the area of a control. Actuation of the control is performed by the system software detecting the touch and entering an appropriate control routine corresponding thereto. Prior art touch panels require a large touch area for each control to prevent operator error such as inadvertant actuation of an undesired control function. In the prior art, the system software either displays the control over a larger than desired area or utilizes a larger than desired touch sensitive area associated with the control. These requirements severely limit the density of displayed controls on the graphically generated control panel.

It is desirable to utilize the touchscreen control technology in implementing the control panel of, for example, a radar system with collision avoidance functionality utilizing a raster scanned display on a CRT monitor. The software generated touch panel control provides the operator interface for controlling the radar and collision avoidance display. It is a desideratum to minimize the number of front panel mechanical controls thereby providing an uncluttered easily utilized radar and collision avoidance system. Ideally, it is desirable to eliminate all mechanical controls and to provide the operator control interface by the touch panel technology. By placing all of the radar and collision avoidance controls on the raster display, the relatively high density of controls required exacerbated the problem of operator control error.

In addition to the above described limitations of prior art touchscreen control panels, adjustment controls such as potentiometers with, for example, thumbwheel actuation were not conveniently incorporated in such software generated control panels.

SUMMARY OF THE INVENTION

The above described disadvantages of the prior art are obviated by apparatus and method whereby the operator slides the control touch over the touchscreen with no control actuation and with visual feedback highlighting the control currently touched. The operator releases touch from the highlighted control to effect actuation of the associated control function.

If the control function is a parameter adjustment, the entire control screen is utilized for sliding touch adjustment of the parameter. Utilization of a short time delay after touch release, before exiting the parameter adjustment mode, provides a thumbwheel affect for the parameter adjustment.

DESCRIPTION OF THE PREFERRED EMBODIMENT

Figure 1:
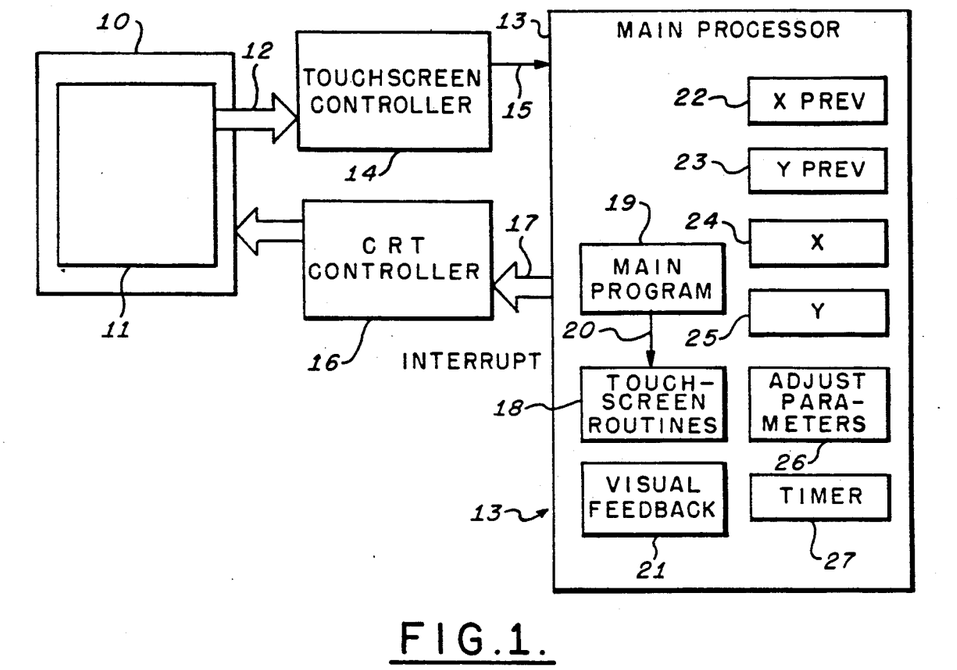
FIG. 1 is a schematic block diagram of a computer controlled system utilizing the touchscreen control panel of the present invention.

Referring to FIG. 1, a schematic block diagram of a preferred embodiment of the invention is illustrated. The system of the present invention includes a cathode ray tube (CRT) display monitor 10 with a touch screen overlay 11. Preferably, the touch screen 11 is of a capacitive type that requires touch contact for touch position input data to be generated. The capacitive type touch screen does not require touch pressure for the data generation. The touch screen 11 continuously provides touch position input data in a conventional X,Y cartesian coordinate format over a bus 12. These properties of the touch screen 11 permit the operator to slide touch over the screen of the monitor 10, maintaining contact without pressure, thereby providing a continuous stream of touch positions on the bus 12. A main processor 13 receives the continuous stream of touch positions via a touch screen controller 14 over a serial bus 15. It is appreciated that when no touch is effected, the X and Y touch positions provided by the touch screen 11 over the bus 12 are both zero. No transmission of touch position occurs when no touch is effected. The main processor 13 sets touch positions to zero at sample time (16 Hz interrupt) if no transmission of touch data has occurred.

The operator touches are sensed by the touch screen 11 and decoded by the touch screen controller 14. The touch screen controller 14 receives the cartesian coordinate data from the touch screen 11 and converts the data to a format, such as serial RS232, suitable for transmission to the main processor 13. Thus the touch screen controller 14 presents the X,Y position data from the touch screen 11 to the main processor 13.

The main processor 13 decodes the touch position and responds by issuing commands to the monitor 10 via a CRT controller 16 and a bus 17, such as a VME bus. Thus the main processor 13 initializes and controls the display provided by the monitor 10 via commands to the CRT controller 16.

The main processor 13 includes touch screen routines 18 for providing the iterative processing required in the generation of the touch screen control panels of the system in which the invention is utilized. The main processor 13 includes a main program 19 containing the software for performing the control procedure functions actuated by operation of the touch screen control panel of the present invention. The main program 19 provides an interrupt on a path 20 to the touch screen routines 18 to control the iterative execution thereof. The interrupt signal is provided every 1/16 seconds. The touch screen routines 18 utilize visual feedback 21 for highlighting controls on the control panal displayed on the monitor 10 by the main processor 13 for reasons to be described. Control highlighting may be effected by the visual feedback 21 by color contrast, intensity contrast, or any other suitable highlighting technique.

The main processor 13 also includes a plurality of storage locations utilized by the touch screen routines 18 in effecting the control routines of the present invention. A store X PREV 22 stores the X touch coordinate of the previous iteration. A store Y PREV 23 stores the Y touch coordinate of the previous iteration. A store X 24 and a store Y 25 store the X and Y touch coordinates, respectively, of the current iteration. As previously described, it is appreciated that when no touch is effected the current X and Y touch positions are both zero. A store ADJUST PARAMETERS 26 stores an adjust parameters flag utilized in the parameter adjustment routine. A time out timer 27 provides a time out signal utilized in the parameter adjustment routine.

Three types of controls may be incorporated in a system utilizing the touch screen control panel of the present invention. These controls are function actuation on release, function actuation on touch, and parameter adjustment.

Function actuation on release controls include toggle switches, mode selection controls, and page control selection. In a manner to be described, these controls are actuated by the operator touching the desired control, with visual feedback highlighting indicating that the desired control is enabled, and then releasing touch to actuate the function. The toggle switch keys return to their original state if touch slides out of the control area on the touchscreen but change if touch is released. In a raster scan radar display system such toggle switches may actuate a true motion display, a timer, a collision alarm and the like. Mode selection switches that are actuated on release may, for example, include display controls for North Up, Course Up, Heading Up and the like. The present invention may be utilized in a system where the control panels are organized into menu driven pages. The main processor 13 may display, on the monitor 10, a menu page of keys which, when actuated by the touchscreen 11, display pages of control panels associated with the menu keys. In this manner large numbers of associated controls may be displayed on the monitor 10 for selective actuation by the operator via the touchscreen 11.

Function actuation on touch controls include momentary switches and parameter adjustment control enabling. The momentary switches actuate the control upon initial touch of the displayed key and the release of touch deactuates the key. These controls are actuated when the operator touches the touchscreen 11 within the area of the control displayed on the CRT monitor 10. Generally, the actuation on touch controls are displayed over a larger touch area than the sliding touch/actuation on release controls. An example of a momentary switch control is the Heading Mark Function.

Parameter adjustment controls include potentiometers, multiselection switches, data entry controls and cursor positioning controls. A parameter adjustment control is enabled by the operator by a first touch on the control key. Successive touches cause the parameter to change value by detecting the change in touch position. Adjustment is facilitated by dedicating the entire touch panal 11 to the enabled control. In a manner to be explained, the parameter adjustment controls are automatically disabled when no touches are detected for a period of time.

The main processor 13 via the CRT controller 16 provides commands to generate the desired characters and control key symbology on the monitor 10. The main processor 13 commands character selection, symbology selection, color selection, and the like. The main processor 13 causes a key or control to be highlighted by commanding selected background and foreground colors. The details of the touchscreen routines 18 are illustrated in the flow charts cf FIGS. 2-5.

Figure 2:
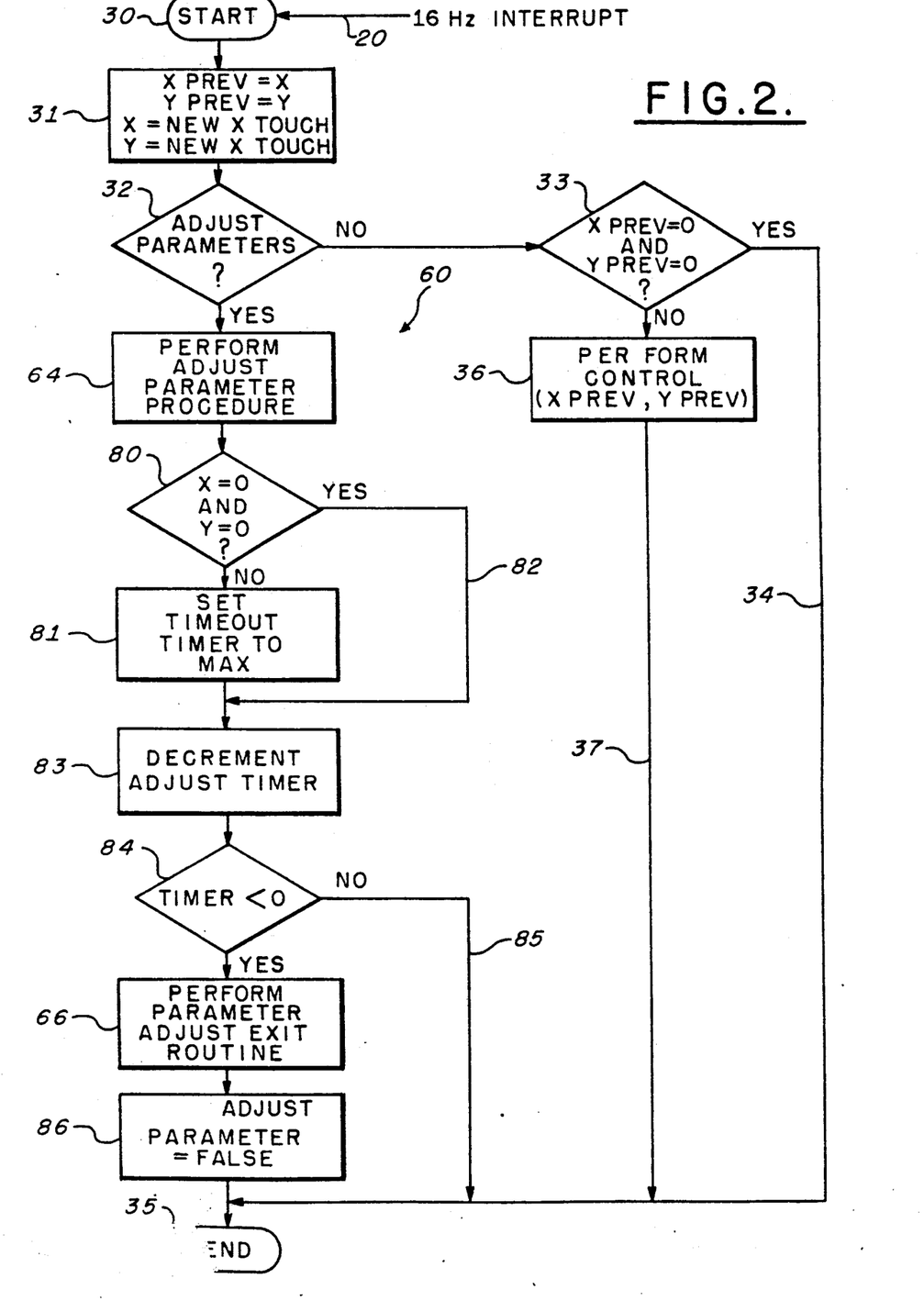
FIG. 2 is a flow chart illustrating the control flow of the interrupt routine utilized in embodying the present invention.

Referring to FIG. 2, the control flow for the touch response interrupt routine is illustrated. The routine of FIG. 2 is interrupt driven on a real time basis every 1/16 seconds and thus the routine is entered at a start block 30 via the 16 Hz. interrupt signal 20. Control flows to a block 31 representing the storage of the X and Y touch positions from the previous iteration in X PREV and Y PREV, respectively, and the new X and Y touch positions in X and Y, respectively. Thus with respect to FIG. 1 the contents of the store 24 are transferred to the store 22 and the contents of the store 25 are transferred to the store 23 and the current X and Y touch coordinates provided via the touch screen controller 14 and the bus 15 are loaded into the stores 24 and 25, respectively. When the operator touches the touch screen 11, the X and Y touch positions sampled by the interrupt routine of FIG. 2 become non-zero. When no touch is effected the new X and Y touch positions are both zero.

Control flow enters a decision block 32 that tests the parameter adjustment flag 26 (FIG. 1) to determine if it is set to true or false. If the parameter adjustment flag is false, control flows to a decision block 33 that tests if there was a touch during the previous iteration. A touch response during the previous iteration is manifested by either X PREV or Y PREV being non-zero. If there was no touch during the previous iteration, X PREV and Y PREV will be zero and control flows via a path 34 to an End Block 35. It is appreciated that means (not shown) are included whereby control executes path 34 to the End Block 35 when there is no touch for at least two iterations. If, however, the touch screen 11 was touched during the previous iteration control flows to a block 36.

Figure 4:
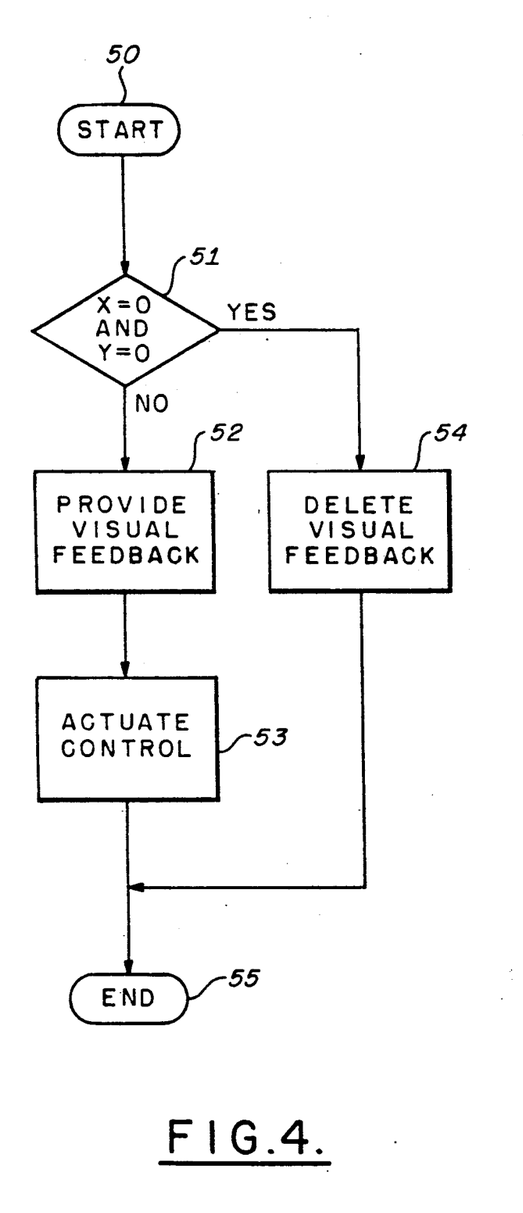
FIG. 4 is a flow chart illustrating the control flow embodying the actuate on touch control functions.
Figure 5:
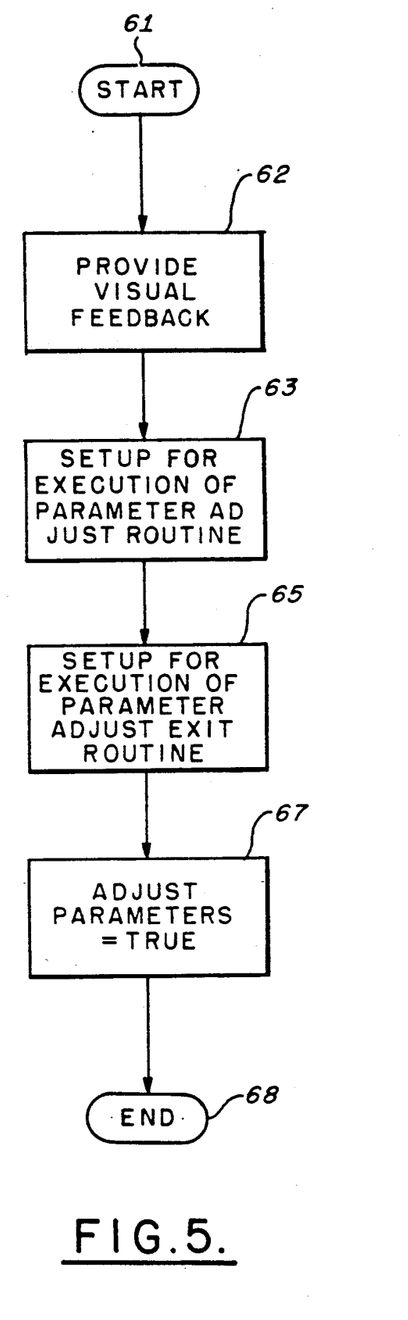
FIG. 5 is a flow chart illustrating the control flow embodying the parameter adjustment control functions.

The block 36 decodes the values X PREV and Y PREV to detect if a control area was touched during the previous iteration. The main program 19 determines if X PREV and Y PREV define a point within the rectangular boundary of a control. If (X PREV, Y PREV) is not within the boundary of any control no processing is performed. If, however, the touch position (X PREV, Y PREV) is within the boundary of a control key, the processing associated with the touched control is performed. Accordingly a control routine defined by X PREV, Y PREV, as detailed in FIGS. 3-5 is executed when a control is touched.

The system includes three types of control routines: Actuate on Release, Actuate on Touch, and Parameter Adjustment. FIG. 3 illustrates the control flow for the Sliding Touch/Actuate on Release controls. FIG. 4 illustrates the control flow for the Actuate on Touch controls. FIG. 5 illustrates the control flow for the Parameter Adjustment controls. Thus the diagrams of FIGS. 3-5 are generic process control flow diagrams initiated and performed when control flow enters the block 36. It is appreciated that the routines performed pursuant to the block 36 are entered via a 1/16 second old touch sample and are exited via a path 37 to the End block 35.

Figure 3:
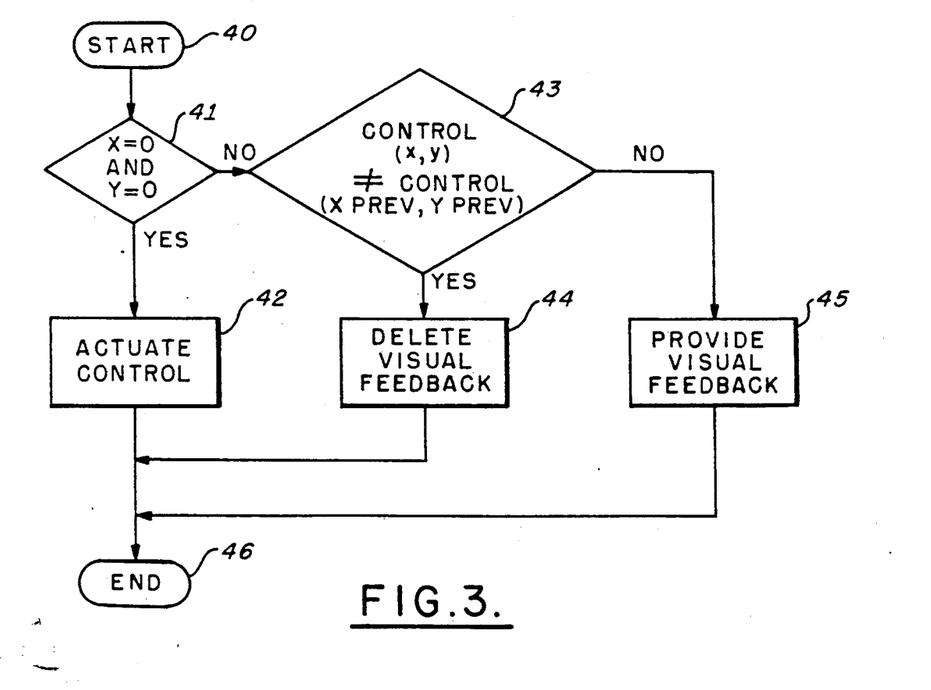
FIG. 3 is a flow chart illustrating the control flow embodying the sliding touch/actuate on release control functions.

If the control being touched is an Actuate on Release control, the routine of FIG. 3 is utilized. Referring to FIG. 3 control enters at a Start block 40 and flows to a decision block 41 for testing the current X,Y touch position. If X and Y are both zero, the operator has released touch and control flows to an Actuate Control block 42. Pursuant to the block 42, the control procedure is actuated corresponding to the control that was touched, highlighted, and released. If, however, in the decision block 41, either X or Y is non-zero control flows to a decision block 43 to determine if the operator is maintaining touch on the same control or has slid touch out of the control boundaries.

Control (X,Y) defines the control within the boundaries of which the touch point (X,Y) resides. The decision block 43 determines whether or not the current touch position (X,Y) resides within the boundaries of the same control as the previous touch position (X PREV, Y PREV). If X and Y indicate that the operator has moved touch to another control, the visual feedback for the control out of which operator touch has slid is deleted from the display pursuant to a block 44. If however X and Y indicate that the operator touch is on the same control, visual feedback is maintained on the touched control pursuant to a block 45. It is appreciated that visual feedback highlighting is dependent on the control selected and is schematically represented by the visual feedback block 21 discussed above with respect to FIG. 1.

Thus the decision block 43 determines if Control (X,Y) is not the same as Control (X PREV, Y PREV). If the touch position (X,Y) is not in a control area, control returns to the Start block 40 until touch slides into the area of a new control. Control flows from the blocks 42, 44, and 45 to an End block 46 whereat the routine of FIG. 3 is exited.

If the control being touched pursuant to the block 36 of FIG. 2 is an Actuate on Touch control, the routine of FIG. 4 is performed. Referring to FIG. 4, control enters at a Start block 50 and flows to a decision block 51 whereat the current touch position (X,Y) is tested. If the current touch position is non-zero, touch resides on the Actuate on Touch control that caused entry into the FIG. 4 routine. Accordingly, visual feedback is provided for the control pursuant to a block 52 and the control is actuated pursuant to a block 53. If however, the current touch position is no longer on this control, the visual feedback is deleted with respect thereto as indicated by a block 54. Control flows from the blocks 53 and 54 to an End block 55 whereat the routine of FIG. 4 is exited.

If Control (X PREV, Y PREV) processed in the block 36 of FIG. 2 is a Parameter Adjustment control, the Parameter Adjustment Controls routine of FIG. 5 is executed. The routine of FIG. 5 sets up a generic parameter adjustment routine 60 of FIG. 2 and sets the Adjust Parameters flag to true so that the parameter adjustment execution will be effected by the 16 Hz interrupt routine. During the parameter adjustment mode, control will repetitively flow through the generic parameter adjustment routine 60 of FIG. 2 until the parameter adjustment timer times out. Thus it is appreciated that because the Adjust Parameter flag is set to true until parameter adjustment timeout, the Parameter Adjustment routine of FIG. 5 will be executed only upon the initial touch of a parameter adjustment control.

Referring to FIG. 5 control flow enters the routine at a Start block 61 and then flows to a block 62 for highlighting the touched parameter adjustment control by providing visual feedback. As discussed above, visual feedback is provided by the visual feedback routine 21 in the main processor 13 of FIG. 1.

Control proceeds to a block 63 to set up the generic parameter adjustment routine 60 of FIG. 2 for execution by the 16 Hz interrupt routine. Specifically the block 63 sets up a Perform Adjust Parameter Procedure block 64 of FIG. 2 as well as the parameter adjustment timer 27 of FIG. 1. The block 63 passes the value to be adjusted and a routine to compute the upper and lower bounds of the value to the block 64 for processing during the subsequent 16 Hz. iterations. The block 63 also passes a timeout time associated with the value to be adjusted to the timer 27 of FIG. 1. In a manner to be described, the generic parameter adjustment routine 60 of FIG. 2, executed every 1/16 seconds when enabled by the Adjust Parameters flag 26 of FIG. 1, senses X position touch changes and adjusts the value of the parameter accordingly.

With continued reference to FIG. 5, after setting up for execution of the parameter adjustment routine at the block 63, control flows to a block 65 that sets up a Parameter Adjust Exit Routine block 66 of FIG. 2 for execution during the 16 Hz interrupt routine. The Set Up for Execution of Parameter Adjust Exit block 65 passes a routine in accordance with the parameter to be adjusted to the block 66 of FIG. 2 to be executed at parameter adjustment timeout. This exit routine deletes the visual feedback highlighting from the actuated control key for the adjusted parameter. Control then flows to a block 67 for setting the Adjust Parameters flag to true. Control exits from the Parameter Adjustment Controls routine of FIG. 5 at an End block 68.

With the Adjust Parameters flag set to true, the system enters the parameter adjustment mode where visual feedback of the parameter adjustment control indicates that this mode is active and all subsequent X touch position changes refer to the parameter being adjusted until the mode is exited. The Adjust Parameter Procedure changes the value of the parameter being modified by sensing changes in operator X touch position. When a parameter adjust control is enabled, touches over the entire touch screen 11 (FIG. 1) are utilized for the modification and no other controls may be activated during this mode. The operator may adjust the parameter from any position on the screen since the adjustment procedure only utilizes changes in X touch positions. X touch data is utilized to modify the parameter, where positive changes in X increase the value of the parameter and negative changes in X decrease the value of parameter.

Referring again to FIG. 2, upon receiving the 16 Hz interrupt, the touch position sampling procedure described above with respect to the block 31 is performed. The Adjust Parameters flag (in store 26 of the main processor 13 of FIG. 1) is tested at the decision block 32. Since the Adjust Parameters flag was set to true at the block 67 (FIG. 5), control flows to the block 64 for performing the Adjust Parameter Procedure. A preferred parameter adjustment procedure may be implemented as follows:

Delta=Delta+(X−X PREV)−Applied Delta *K
If (X=0 or X PREV=0) Delta=0
Applied Delta=Delta/K
Parameter=Parameter+Appli  Delta The factor K determines the parameter adjustment touch sensitivity by relating the change in parameter value to the magnitude of the touch position change.

After performing the procedure pursuant to the block 64, control flows to a decision block 80 to test if a touch is being maintained. If the operator is touching the screen, the parameter adjust timer 27 (FIG. 1) is set to maximum at a block 81. If touch has been released, the block 81 is bypassed by a path 82. Control flows thereafter to a block 83 whereat the timer 27 is decremented. From the block 83 control flows to a decision block 84 to determine if the timer 27 has timed out. If the timer 27 has not timed out, control flows via a path 85 to the End block 35.

Thus when a parameter is being adjusted, no touch results in no change to the value of the parameter and permits the parameter adjustment timeout timer to decrement by not resetting the timer to maximum. When the timer 27 times out, control flows to the block 66 whereat the Parameter Adjust Exit Routine is performed. The exit routine deletes the parameter adjust control visual feedback and sets the Adjust Parameters flag to false at a block 86. After setting the flag to false, control flows to the End block 35.

Thus it is appreciated that the parameter adjustment mode is exited with touch reverting to normal operation upon release of touch after the time delay effected by the timer 27 has timed out. The logic implemented by the blocks 80-84 and the timer 27 provides a thumb wheel affect to the parameter adjustment procedure. The parameter adjustment mode may be entered either by the Actuate on Touch or the Sliding Touch/Actuate on Release procedures described above. While the parameter adjustment mode is enabled, the actuated control process is performed at the real time rate of 16 Hz via the 16 Hz interrupt routine of FIG. 2. The parameter adjustment procedure facilitates entering data into the system by the operator.

The touch panel apparatus of the present invention provides advantages over previous touch panel controls since the operator selects a control in a crowded control area by sliding touch to the control until receiving visual feedback assurance of proper control selection. The operator then actuates the control function by releasing touch. The two principle advantages of the sliding touch process of the present invention are: 1) a considerable reduction in accidental acutation of a control, and 2) a significant enhancement in control density since the controls may be displayed over significantly smaller areas because of the sliding touch, visual feedback, and actuation upon release process.

It is appreciated from the foregoing that the invention renders touchscreen front panels more desirable for use as a device control than prior art arrangements. The present invention provides greater versatility than prior art configurations because the software controls the appearance of the front panel layout. The invention is less expensive since the number of mechanical switches required is reduced to a minimum.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. Touchscreen control panel apparatus for use in a system having actuate on release control functions, said apparatus comprising a monitor having a display, touchscreen means, including a touchscreen overlay on said display for providing touch coordinate signals in accordance with operator touch location on said touchscreen overlay and for providing a touchscreen release signal upon removal of said operator touch, key generation means for providing control keys on said display, a first plurality of said control keys being associated with a plurality of said actuate on release control functions, respectively, highlighting means coupled to said touchscreen means for highlighting only an operator touched control key, sliding touch detecting means coupled to said touchscreen means for detecting when operator touch has slid from a first control key to a second control key, highlight deletion means coupled to said touchscreen means for deleting said highlighting with respect to a control key from which operator touch has slid, and first control actuation means coupled to said touchscreen means for actuating a control function associated with a highlighted control key in response to said touchscreen release signal when said highlighted control key is associated with one of said actuate on release control functions.

2. The apparatus of claim 1 wherein said touchscreen overlay comprises a capacitive touchscreen.

3. The apparatus of claim 1 wherein said system further includes actuate on touch control functions, a second plurality of said control keys different from said first plurality of control keys being associated with a plurality of said actuate on touch control functions, respectively, said apparatus further including second control actuation means coupled to said touchscreen means for actuating a control function associated with a highlighted control key in response to operator touch thereon when said highlighted control key is associated with one of said actuate on touch control functions.

4. The apparatus of claim 3 further including iterative means coupled to said touchscreen means, comprising means for storing said touch coordinate signals for a current iteration, means for storing said touch coordinate signals from an iteration prior to said current iteration, and routine determining means for determining whether a touched control key controls an actuate on release control function or an actuate on touch control function when said touchscreen release signal is absent.

5. The apparatus of claim 4 wherein said routine determining means includes adjustable parameter determining means for determining if a control function associated with a touched control key controls an adjustable parameter and further including parameter adjustment means coupled to said adjustable parameter determining means for adjusting parameters of an actuated control function.

6. The apparatus of claim 5 wherein said parameter adjustment means comprises parameter value adjustment means for adjusting the value of a parameter in accordance with changes in said touch coordinate signals, and parameter adjustment actuating means for actuating said parameter value adjustment means when said routine determining means detects a touched key associated with said parameter.

7. The apparatus of claim 6 wherein said parameter adjustment means includes an adjust parameters flag set in response to said routine determining means detecting a touched key associated with said adjustable parameter, said parameter value adjustment means being actuated when said adjust parameters flag is set.

8. The apparatus of claim 6 wherein said parameter adjustment means includes timer means decremented in response to said touch release signal for controlling deactuation of said parameter value adjustment means when said timer times out.

9. The apparatus of claim 6 wherein said touch coordinate signals comprise first and second coordinate signals and said parameter value adjustment means comprises means for adjusting the value of said parameter in accordance with changes in said first coordinate signal only.

10. A method of control function actuation utilizing a touchscreen overlay on a monitor display comprising providing graphically generated control keys on said monitor display, sliding an operator touch over said graphically generated control keys, highlighting only a control key being touched, deleting highlighting from a key from which touch has slid, and releasing a highlighted control key to actuate a control function associated therewith.

11. The method of claim 10 including a method for adjusting the value of a parameter comprising highlighting a touched control key associated with said parameter, and adjusting said parameter by sliding touch at any location on said touch screen.

12. The method of claim 11 further including deactuating said parameter value adjustment method when a predetermined time has elapsed after touch has been released from said touchscreen.

* * * * *

(12) EX PARTE REEXAMINATION CERTIFICATE (5068th)
United States Patent
Cornett et al.

(10) Number: US 5,053,758 C1
(45) Certificate Issued: Mar. 1, 2005

(54) TOUCHSCREEN CONTROL PANEL WITH SLIDING TOUCH CONTROL

(75) Inventors: Johnny A. Cornett, Crozet, VA (US); James D. Corbett, Charlottesville, VA (US)

(73) Assignee: Sperry Marine Inc., Charlottesville, VA (US)

Reexamination Request:
No. 90/006,910, Jan. 16, 2004

Reexamination Certificate for:
Patent No.: 5,053,758
Issued: Oct. 1, 1991
Appl. No.: 07/476,118
Filed: Feb. 1, 1990

Related U.S. Application Data

(63) Continuation of application No. 07/151,041, filed on Feb. 1, 1988, now abandoned.

(51) Int. Cl.⁷ ................................................. G09G 5/00
(52) U.S. Cl. ........................ 345/174; 341/33; 178/18.06
(58) Field of Search ............................ 345/173–179, 345/180–183; 178/18.01–18.09, 18.11, 19.01, 19.02, 19.03, 19.04; 341/20, 22, 24, 33, 34

(56) References Cited

U.S. PATENT DOCUMENTS 3,482,241 A   12/1969   Johnson
4,224,615 A   9/1980    Penz
4,587,630 A   5/1986    Straton et al.

FOREIGN PATENT DOCUMENTS

| EP | 0030160     | 6/1981  |
| EP | 0135391 A2  | 3/1985  |
| JP | 54-24539    | 2/1979  |
| JP | 62-73327    | 4/1987  |
| JP | 62-242220   | 10/1987 |
| JP | 63-18425    | 1/1988  |

OTHER PUBLICATIONS

A.G. Cole et al. "Touch–Sensitive Overlay Selection Repeater", IBM Technical Disclosure Bulletin, vol. 26, No. 5, Oct. 1983, pp. 2620–2621, New York, USA.

Steven K. Gregory, "Interactive Television Control System", Advances In Instrumentation, vol. 35, part 2, 1980, pp. 111–119, Research Triangle Park, North Carolina, USA.

Primary Examiner—Lun-Yi Lao (57) ABSTRACT

Touchscreen control panel apparatus that highlights a control key to which the operator slides touch and actuates the associated control function upon touch release from the highlighted key. Highlighting is deleted from a key when operator slides touch therefrom without releasing touch. Parameter values are adjusted by touching a control key associated therewith and thereafter sliding touch anywhere on the touchscreen to effect parameter value change.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–12 is confirmed.

New claims 13–15 are added and determined to be patentable.

*13. The apparatus of claim 1 wherein said highlighting means and said highlight deletion means operate such that said highlighting follows the operator touch as it slides from said first control key to said second control key.*

*14. The method of claim 10 further including following the operator touch with highlighting as said operator touch slides from one of said graphically generated control keys to another of said graphically generated control key.*

*15. Touchscreen control panel apparatus for use in a system having actuate on release control functions, said apparatus comprising:*

*a monitor having a display;*

*a touchscreen overlay on the display for providing touchscreen coordinate signals in accordance with operator touch location on the touchscreen overlay, and for generating a touchscreen release signal upon removal of the operator touch;*

*a main processor operatively associated with the display for causing the generation of a plurality of graphical control keys on the display, each control key being associated with a respective control function;*

*the main processor further being operative to cause the highlighting of only a control key corresponding to a current operator touch location;*

*the main processor further being operative to detect when operator touch has slid from a location corresponding to a first control key to a location corresponding to a second control key and to delete highlighting with respect to the control key corresponding to the location from which the operator touch has slid; and*

*a control routine for activating a control function corresponding to a highlighted control key associated with the current touch location upon generation of the touch screen release signal.*

\* \* \* \* \*